United States Patent [19]

Onda et al.

[11] 4,054,891
[45] Oct. 18, 1977

[54] DRIVING DEVICE FOR A CAMERA SHUTTER

[75] Inventors: Eiichi Onda, Yotsukaido; Masanori Watanabe, Narashino, both of Japan

[73] Assignee: Seiko Koki Kabushiki Kaisha, Japan

[21] Appl. No.: 708,026

[22] Filed: July 23, 1976

[30] Foreign Application Priority Data

July 23, 1975 Japan .................. 50-89982
July 23, 1975 Japan .................. 50-89983

[51] Int. Cl.² .......................................... G03B 9/40
[52] U.S. Cl. .............................. 354/246; 354/249; 354/266
[58] Field of Search .......... 354/246, 249, 245, 248, 354/250, 261, 266

[56] References Cited

U.S. PATENT DOCUMENTS

| | | | |
|---|---|---|---|
| 3,810,224 | 5/1974 | Kitai et al. | 354/250 |
| 3,829,878 | 8/1974 | Onda et al. | 354/249 |
| 3,999,196 | 12/1976 | Inoue | 354/249 |

*Primary Examiner*—John Gonzales
*Attorney, Agent, or Firm*—Robert E. Burns; Emmanuel J. Lobato; Bruce L. Adams

[57] ABSTRACT

In a focal plane camera shutter of the type having opening blades and closing blades which are actuated sequentially to provide an exposure, the opening blades are operated by an operating member which is biased in a direction to move the blades to aperture-closing position. The opening blades are moved to open position when the shutter is released by a driving member which is biased in a direction to open the blades and is releasably connected to the operating member by a connecting member. At approximately the termination of the exposure, the connecting member is actuated to release the blade operating member from the driving member whereupon they are moved by the aforementioned bias to closed position. The camera is then reset by moving the driving member to its set position whereupon the connecting member again connects the driving member with the blade operating member. The closing blades may likewise have an operating member releasably connected to a driving member by a connecting member which is released upon termination of the exposure so that the closing blades likewise return to set position.

11 Claims, 10 Drawing Figures

DRIVING DEVICE FOR A CAMERA SHUTTER

FIELD OF INVENTION

The present invention relates to camera shutters and particularly to actuating means for opening and closing the shutters.

BACKGROUND OF INVENTION

Generally, there have been the following defects in metal, focal plane shutters for cameras of the type in which a group of opening (leading) and closing (trailing) blades are actuated sequentially to first open and then close the aperture to effect an exposure.

Firstly, it is difficult to adapt a shutter of this kind to miniaturized cameras because the space required for folding a group of shutter blades tends to increase the size of the shutter. As a means of eliminating this defect, it has been proposed to reduce the size of the space required for a group of shutter blades through a minute division of the shutter blades or by making the shutter blade smaller. However, the former method creates defects in that the blocking of light rays become deficient as the division of the blades is increased and also that actuation of the blades become more difficult, thereby causing exposure inaccuracy. Moreover, the durability of the shutter is impaired because a group of shutter blades is subject to increased inertia. The latter method creates a defect in that the blocking of light rays becomes deficient because of a decrease in the amount the blades are overlapped when they cover the aperture.

Secondly, such shutters have the defect that they are heavy in operation when being set and lack durability since a more powerful driving force is required to actuate a group of shutter blades with a large mass of inertia.

Thirdly, when the shutter blades are moved at high velocity in order to obtain a short exposure time or when synchronizing the shutter with a speed light, a group of closing blades may rebound from closed position so as partially to open the aperture and thus cause a reexposure after completion of the exposure actuation.

SUMMARY OF INVENTION

It is an object of the present invention to overcome the aforementioned defects of presently available shutters. In accordance with the invention, an operating member for actuating the opening (leading) shutter blades is biased in a direction to move the blades to aperture-closing position. A driving member which is biased in a direction to move the opening blades to open position is releasably connected to the operating member by a connecting member. By reason of this connection, the driving member when released from set position acts through the connecting member to move the blades to open position. When the closing (trailing) blades have moved to aperture-closing position to complete the exposure, the connecting member is actuated so as to release the operating member from the driving member whereupon the bias acting on the operating member moves the opening blades to set condition in which they close the aperture. The camera is then set or charged by moving the driving member against its bias to set position whereupon the connecting member again connects the driving member with the operating member.

The closing blades may be operated in like manner by means of an operating member releasably connected to a driving member. In this event, the connecting member between the driving member and the operating member for the closing blades is actuated when the opening blades have returned to set position to release the operating member from the driving member for the closing blades whereupon the closing blades are moved to set position by the bias acting on the operating member. The shutter can thereupon be set or charged by moving both driving members to set position where they are retained in known manner by suitable latch means until the shutter is again released.

In another embodiment of the invention, the driving member and connecting member for the closing blades are omitted in which event the operating member is biased in a direction to move the closing blades to aperture closing position. Upon completion of an exposure, the opening blades of the shutter are returned to set (aperture closing) position while the closing shutter blades remain in closed position until the shutter is reset or charged.

The shutter actuating means in accordance with the present invention has the following important advantages:

Firstly, where the shutter is designed for a miniature camera, it is possible by the precise operation of the shutter blades to prevent a reduction of the shading of light rays that may arise from making the blades capable of being held in a very small space for subdivided blades and making the blades smaller with a reduced overlap when in aperture covering position.

Secondly, where the mass of inertia for a group of shutter blades is to be reduced, it is possible to prevent a reduction in the shading of light rays that may arise from the use of smaller blades with a reduced overlap in closed position or the combustion of blades that may arise from exposure of the closing blades to the direct rays of the sun when the closing blades are made of plastic.

Thirdly, by providing a construction in which a group of opening blades can be displaced immediately to set (aperture-closing) position upon completion of an exposure, it is possible to prevent reexposure caused by rebound of the closing blades since the opening blades already cover the aperture before the closing blades can rebound.

Fourthly, the invention has the advantages that the shutter cocking or charging is light, operation is positive, durability is excellent and the shutter structure is simple since it does not need any strong driving force for displacing a group of opening blades or groups of opening and closing blades to set position after completion of an exposure.

Accordingly, the present invention makes possible a smaller and more excellent camera as compared with existing cameras using conventional shutters.

BRIEF DESCRIPTION OF DRAWINGS

The nature, objects and advantages of the invention will be more fully understood by the following description of preferred embodiments shown schematically and by way of example in the accompanying drawings in which.

Figure 1:
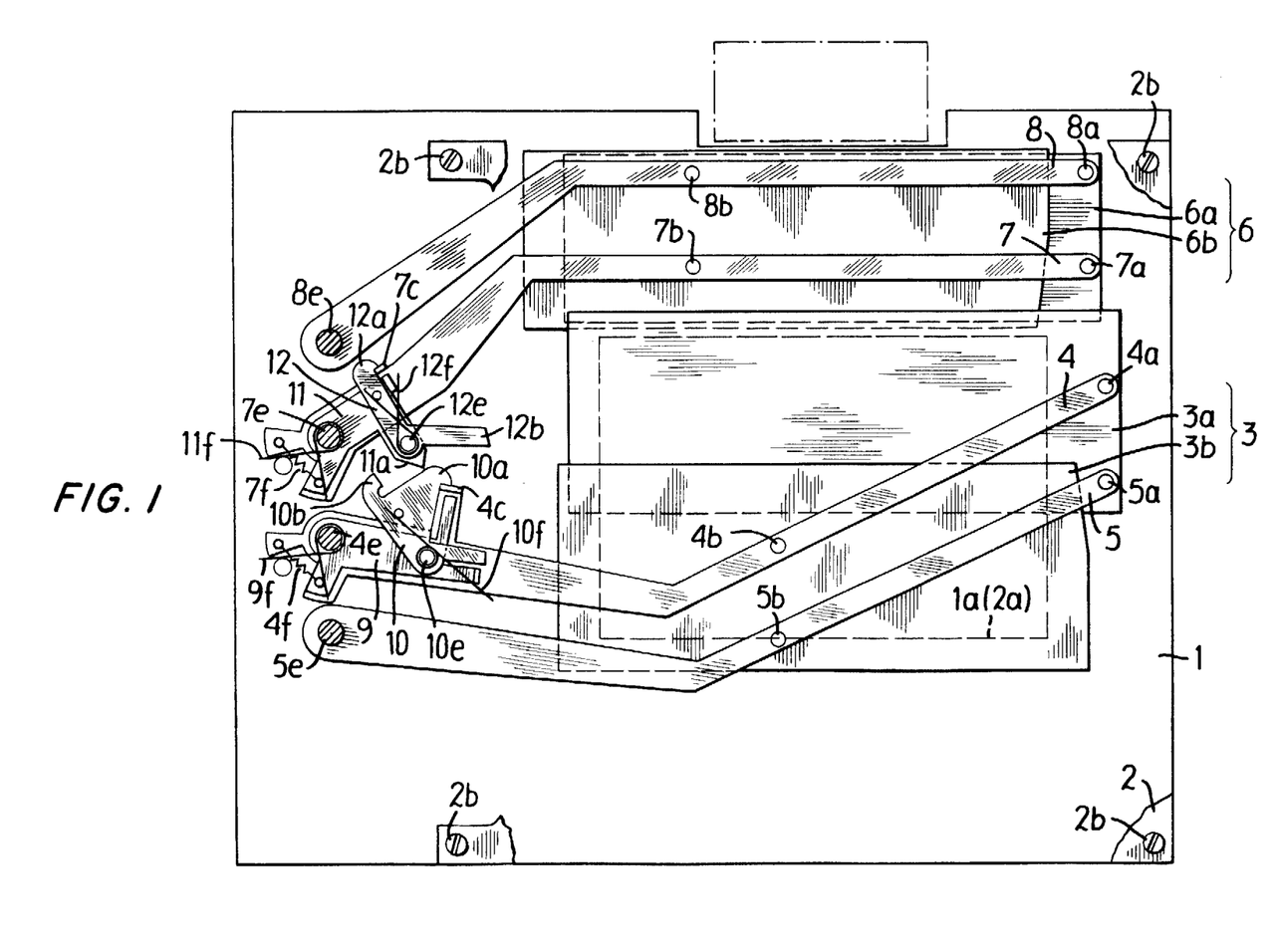
FIG. 1 is a front view of a shutter and shutter operating mechanism in accordance with the present invention showing the shutter in set condition.
Figure 2:
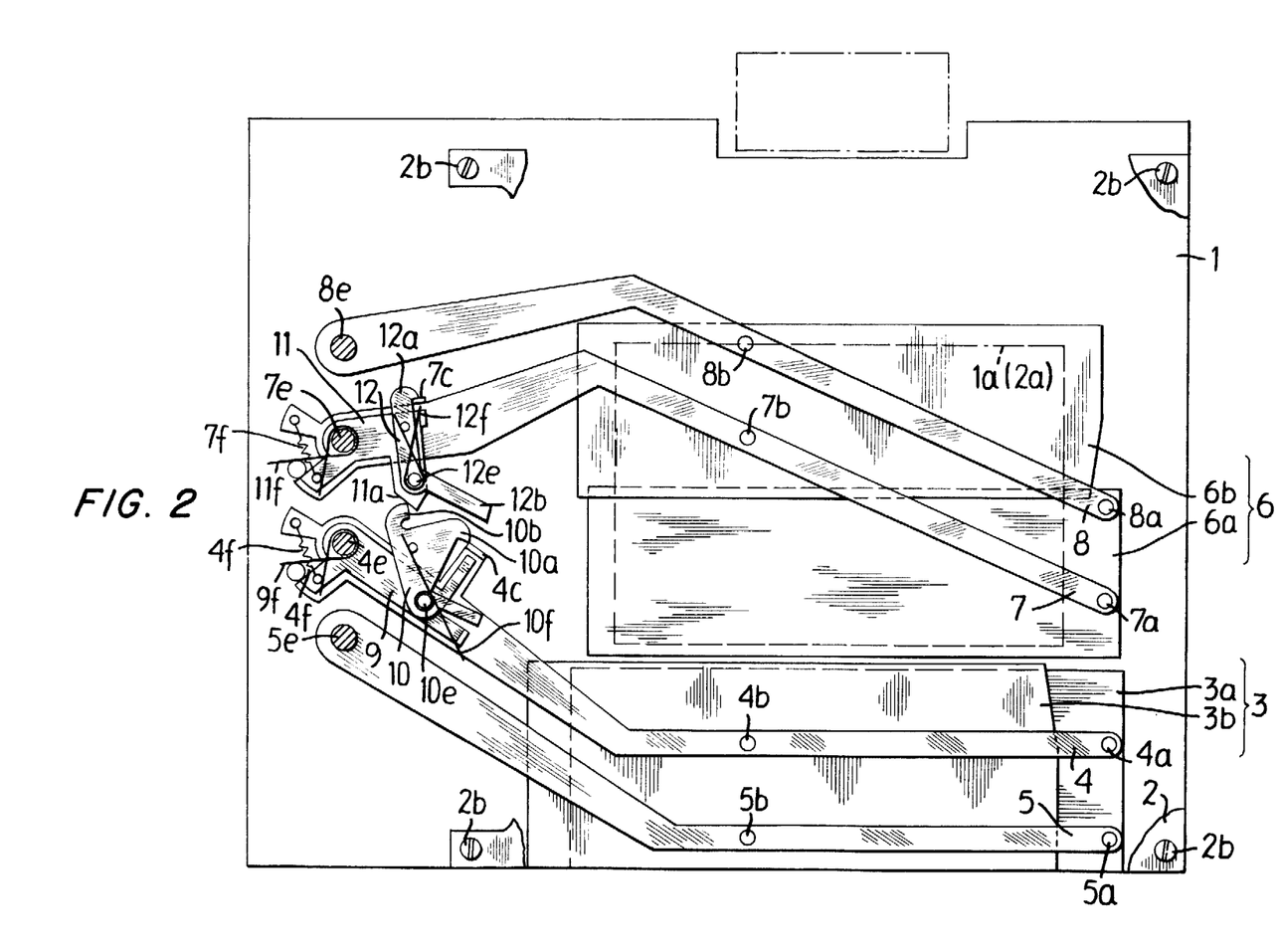
FIG. 2 is a view similar to FIG. 1 but showing the shutter at the completion of an exposure.
Figure 3:
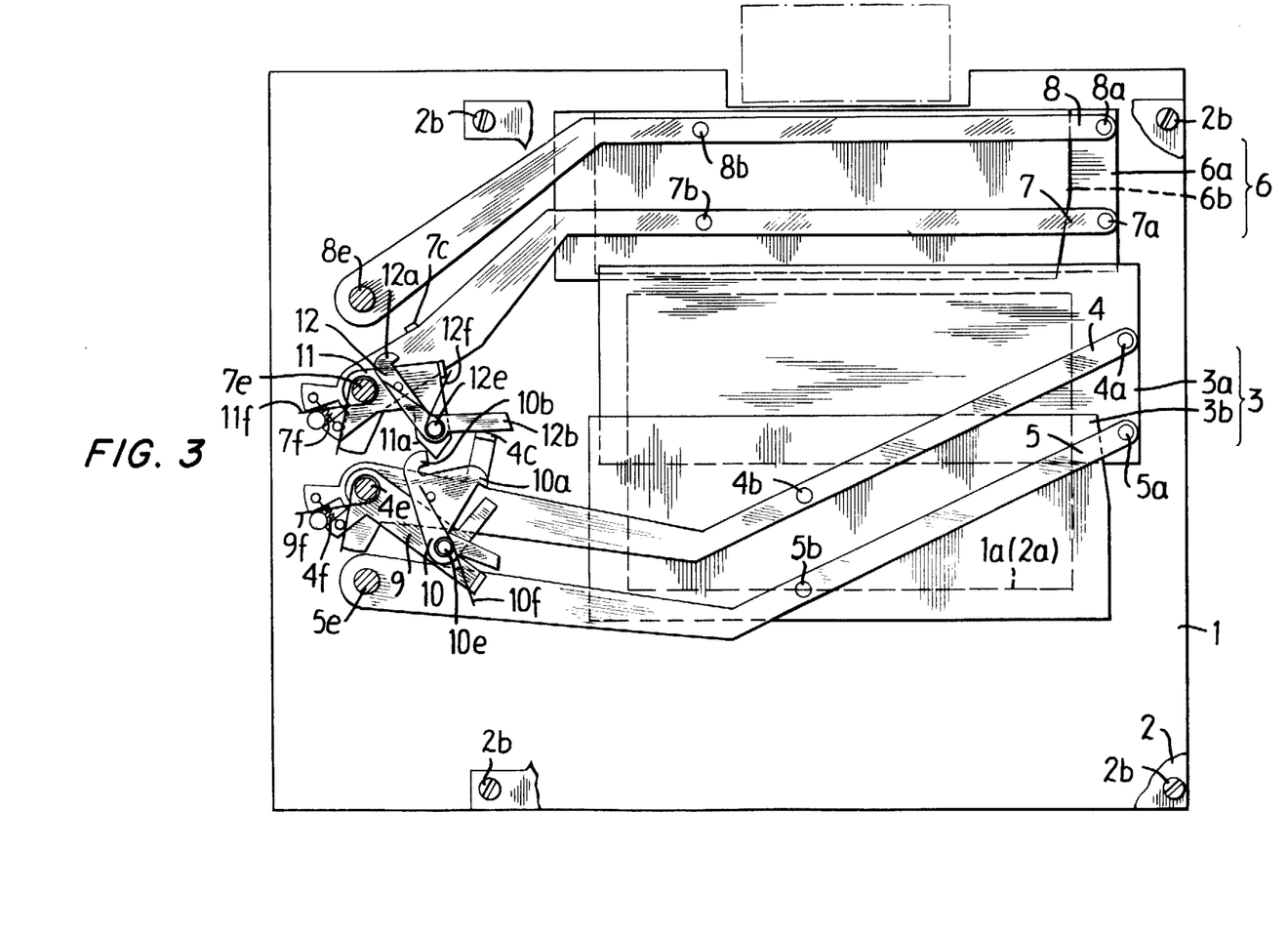
FIG. 3 is a view similar to FIG. 1 but showing the shutter after it has finished a sequence of operation with the shutter blades returned to set position but before the driving members have been reset.

DESCRIPTION OF PREFERRED EMBODIMENTS:

In the embodiment of the invention shown in FIGS. 1 to 3, a base plate 1 has an aperture 1a for exposing a film to the light rays. A cover plate 2 has an aperture 2a coincident with the aperture 1a and is firmly fixed on the base plate 1 as indicated at 2b to provide an actuating space for the shutter blades between the base plate and cover plate. A group of opening blades 3 for opening the aperture 1a when making an exposure is shown as being composed of two blades, namely an opening slit-forming blade 3a and a shading blade 3b. The blades are movable by a link mechanism comprising an opening member 4 and an auxiliary opening member 5 pivotally mounted on the base plate 1 with axes 4e and 5e respectively. The operating member 4 is pivotally connected with the blades 3a and 3b pivots 4a and 4b respectively while the auxiliary opening member 5 is pivotally connected with the blades 3a and 3b by pivots 5a and 5b respectively, thus providing a parallelogram linkage system.

A group of closing blades 6 for closing the aperture 1a to complete an exposure is shown as comprising two blades, namely a slit-closing blade 6a and a shading blade 6b. The closing blades are operable by a link mechanism comprising a closing member 7 and an auxiliary closing member 8 pivotally mounted on the base plate 1 with axes 7e and 8e respectively. The closing member 7 and auxiliary closing member 8 are pivotally connected with the closing blades 6a and 6b by pivots 7a, 7b, 8a and 8b in a manner similar to the connection of opening members 4 and 5 with the opening shutter blades.

A driving member 9 for the opening blades is pivotally mounted on the base plate 1 with the same axis 4e as the opening member 4 and is biased in a clockwise direction by a spring 9f. The opening member 4 is provided with a bent-up tab 4c and is biased in a counterclockwise direction by a spring 4f acting between the opening member 4 and the driving member 9. A connecting member 10 for connecting the opening member 4 and the driving member 9 of the opening blades is pivotally mounted on the driving member 9 by a pivot 10e and is biased in a clockwise direction by a spring 10f. The connecting member 10 is provided with a pawl 10a capable of locking and unlocking the bent-up tab 4c of the opening member 4 and with a bent-up tab 10b for disengaging the pawl from the opening member as will be described below.

A driving member 11 for the closing blades is pivotally mounted on the base plate coaxially with the pivot 7e and is biased in a clockwise direction by means of a closing blade driving spring 11f. The closing member 7 is provided with a bent-up tab 7c and is biased in a counterclockwise direction by means of a spring 7f acting between the closing member 7 and the driving member 11 for the closing blades. A connecting member 12 for connecting the closing member 7 and the driving member 11 for the closing blades is pivotally mounted on the driving member 11 by a pivot 12e and is biased in a clockwise direction by a spring 12f. The connecting member 12 is provided with a pawl 12a capable of locking and unlocking the bent-up tab 7c of the closing member 7 and with an arm 12b adapted to hit the bent-up tab 4c of the opening member 4 in order to release the pawl as described below. The driving member 11 for the closing blades is provided with an arm 11a adapted to hit the bent-up tab 10b of the connecting member 10 for the opening blades so as to disengage the pawl 10a from the bent-up tab 4c of the opening member 4.

If the camera is intended to be miniaturized, the group of closing blades 6 may consist of subdivided or small blades, for example three or four leaves. Moreover, for the purpose of reducing the mass of inertia of the group of shutter blades, the group of closing blades 6 may consist of smaller blades or lighter blades than the opening blades, for example blades of plastic material.

The operation of the shutter and shutter operating mechanism will now be explained starting with the shutter in set position as illustrated in FIG. 1. If the opening member 4 is released from the position shown in FIG. 1 by a well known device, the opening member 4 is turned in a clockwise direction by the driving member 9 under the force of the driving spring 9f and thereby moves the opening blades 3 downwardly to open the aperture 1a for exposure of the film. When the required time for exposure has elapsed after the opening blades 3 started opening actuation, the closing member 7 is released by a well known device and starts turning in a clockwise direction being driven by the driving member 11 under the force of spring 11f. The closing blades 6 are thereby moved downwardly to close the aperture 1a for completion of the exposure.

FIG. 2 shows the condition just after the exposure actuation has been completed. It will be seen that the arm 11a of the driving member 11 for the closing blades has engaged the bent-up tab of the connecting member 10 for the opening blades so as to turn the connecting member 10 in a counterclockwise direction and thereby release the bent-up tab 4c of the opening member 4 from engagement with the pawl 10a. The opening member 4 is thereby set free from connection with the driving member 9 and starts turning counterclockwise by means of the spring 4f so as to displace the opening blades upwardly to closed position. After the opening member 4 has turned counterclockwise through a predetermined displacement, the bent-up tab 4c engages the arm 12b of the connecting member 12 of the closing member and thereby releases pawl 12a from engagement with the bent-up tab 7c of the closing member 7. The closing member 7 is thereby set free from connection with the driving member 11 and starts turning in a counterclockwise direction by means of the spring 7f, thereby displacing the closing blades upwardly. The opening blades 3 and closing blades 6 are thus respectively returned to preset positions without opening the aperture 1a. This completes the sequence of operations initiated by release of the shutter. As seen in FIG. 3, the opening blades 3 and closing blades 6 are displaced to and halted at set positions while the opening driving member 9 and closing member 11 are still in their released positions. In order to set or charge the shutter, the opening driving member 9 and closing driving member 11 are made to turn in a counterclockwise direction in well known manner against the respective driving springs 9f and 11f from the position shown in FIG. 3 to the position shown in FIG. 1. When the driving members 9 and 11 are returned to set position, the connecting members 10 and 12 reengage respectively with the opening member 4 and closing member 7 to reconnect the opening and closing members with the respective driving members. The shutter actuating mechanism is thereby returned to its initial set position in which it is held by suitable latching means in known manner until the shutter is again released to make another exposure.

Figure 4:
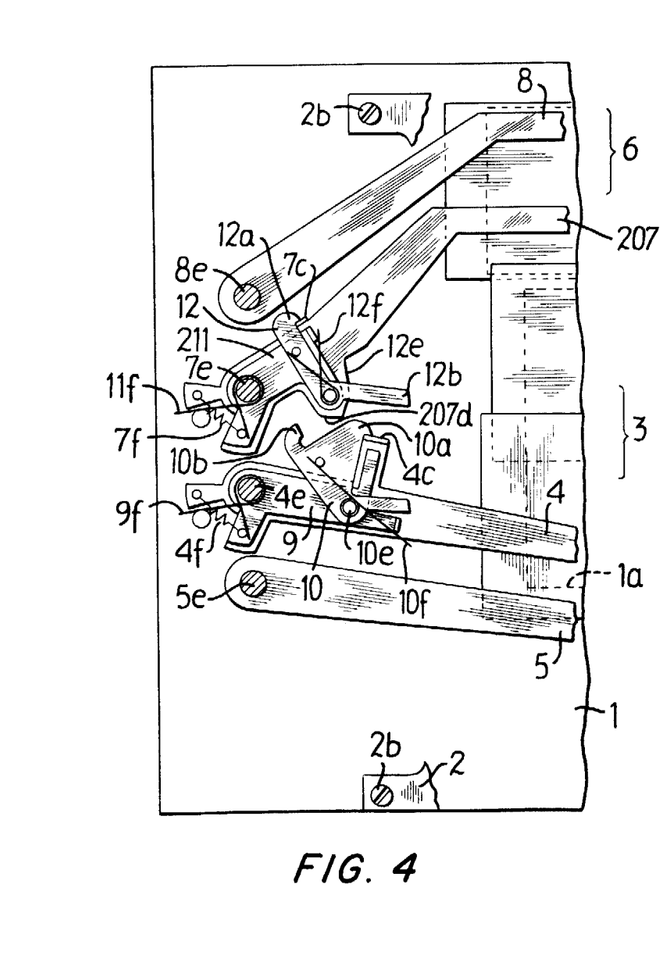
FIGS. 4 and 5 are partial front views showing modifications.

A second embodiment of the invention is illustrated in FIG. 4 in which the same parts are designated by the same reference numerals as in FIGS. 1 to 3 while corresponding but modified parts are designated by the same numbers with the addition of 200. In the embodiment of FIG. 4, the closing member 207 is provided with an arm 207d which is engageable with the bent-up tab 10b of the connecting member 10 for the opening blades to release the opening member 4 from the driving member 9 after completion of exposure actuation. Thus, this function is performed by the closing member 207 rather than by the driving member 11 as in the embodiment of FIGS. 1 to 3. The construction is otherwise the same as in FIGS. 1 to 3 and hence the description will not be repeated.

Figure 5:
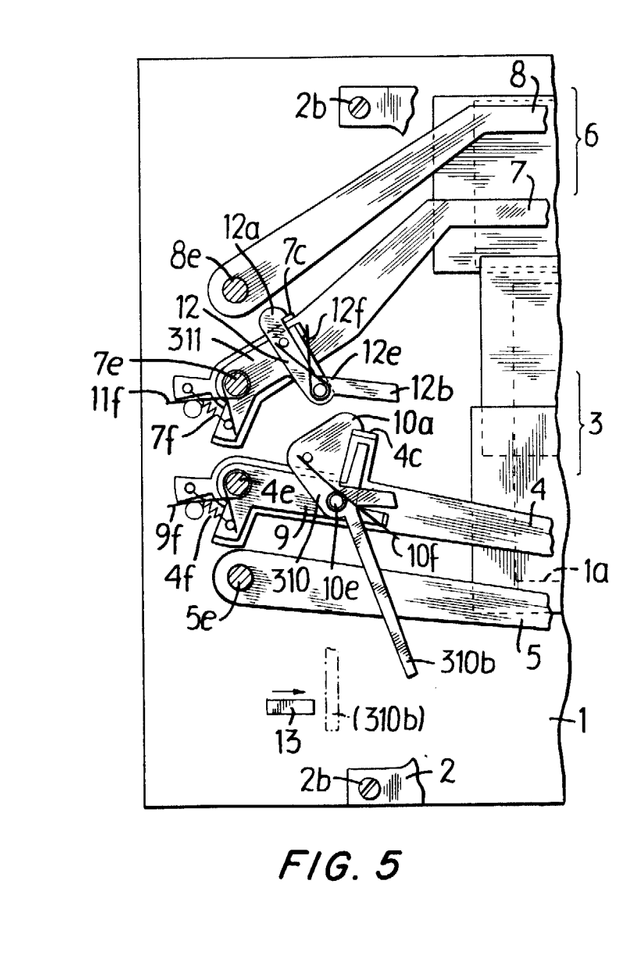

A third embodiment of the invention is shown in FIG. 5 in which the same parts are designated by the same reference numerals as in FIGS. 1 to 3 while modified parts are designated by the same reference numeral with the addition of 300 and additional parts are designated by additional reference numeral. In the embodiment of FIG. 5, an operating member 13 is provided for operation of the reflector and lens diaphragm of a single lens reflex camera. The operating member 13 is movable in the direction of the arrow to return the reflector to image reflecting position and to return the lens diaphragm to open diaphragm position. The operating member 13 is also used to release the connection of the opening member 4 with the driving member 9 upon completion of exposure actuation. For this purpose the connecting member 310 is provided with an arm 310b which at the completion of the exposure is in the position shown in broken lines and designated (310b). In this position the arm 310b is engaged by the operating member 13 to turn the connecting member 310 in a counterclockwise direction and thereby release the opening member 4 from the driving member 9. The opening member 4 is thereby permitted to turn in a counterclockwise direction under the force of the spring 4f to return the opening blades to set position. As the connecting member 310 is released by the arm 310b it is not provided with a bent-up tab corresponding to the tab 10b of the first embodiment. Except as otherwise shown and described, the embodiment of FIG. 5 is the same as that of FIGS. 1 to 3.

Figure 6:
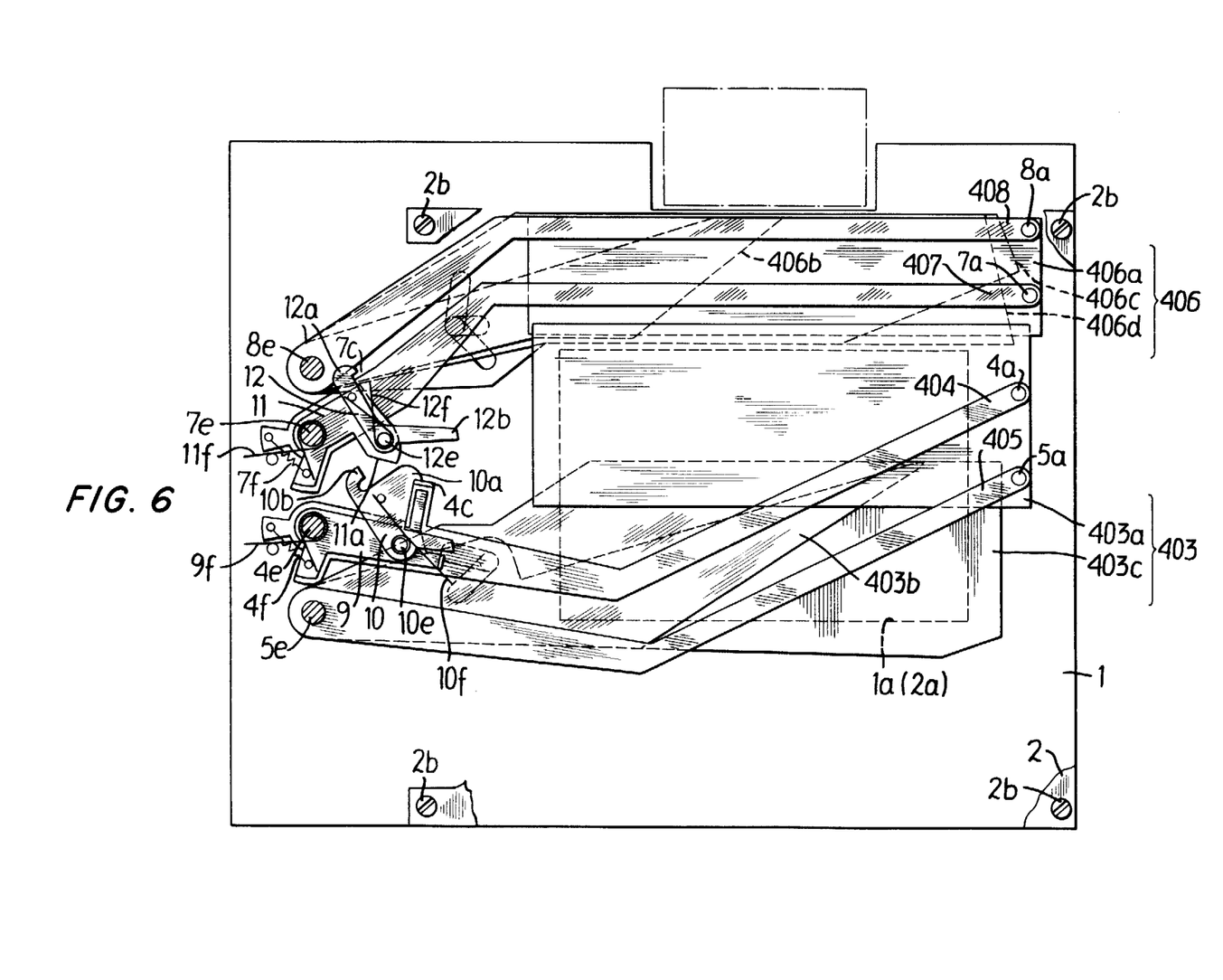
FIG. 6 is a front view of the shutter showing a further modification.

A fourth embodiment of the invention is illustrated in FIG. 6 where the same parts are designated by the same reference numerals as in FIGS. 1 to 3 while corresponding but modified parts are designated by the same reference numerals with the addition of 400. As in FIGS. 1, 4 and 5, the shutter is shown in a charged state. In the embodiment of FIG. 6, a group of opening blades is composed of an opening slit-forming blade 403a and rotary type covering blades 403b and 403c. The closing blades 4 consist of a slit-closing blade 406a and rotary type covering blades 406b, 406c and 406d. The fundamental construction and method of actuation of the group of opening blades 403a–c and group of closing blades 406a–d are known from U. S. application, Ser. No. 396,434 and hence no further explanation is believed necessary. Except as illustrated and described, the construction and operation of the embodiment of FIG. 6 are the same as the embodiment of FIGS. 1 to 3.

Figure 7:
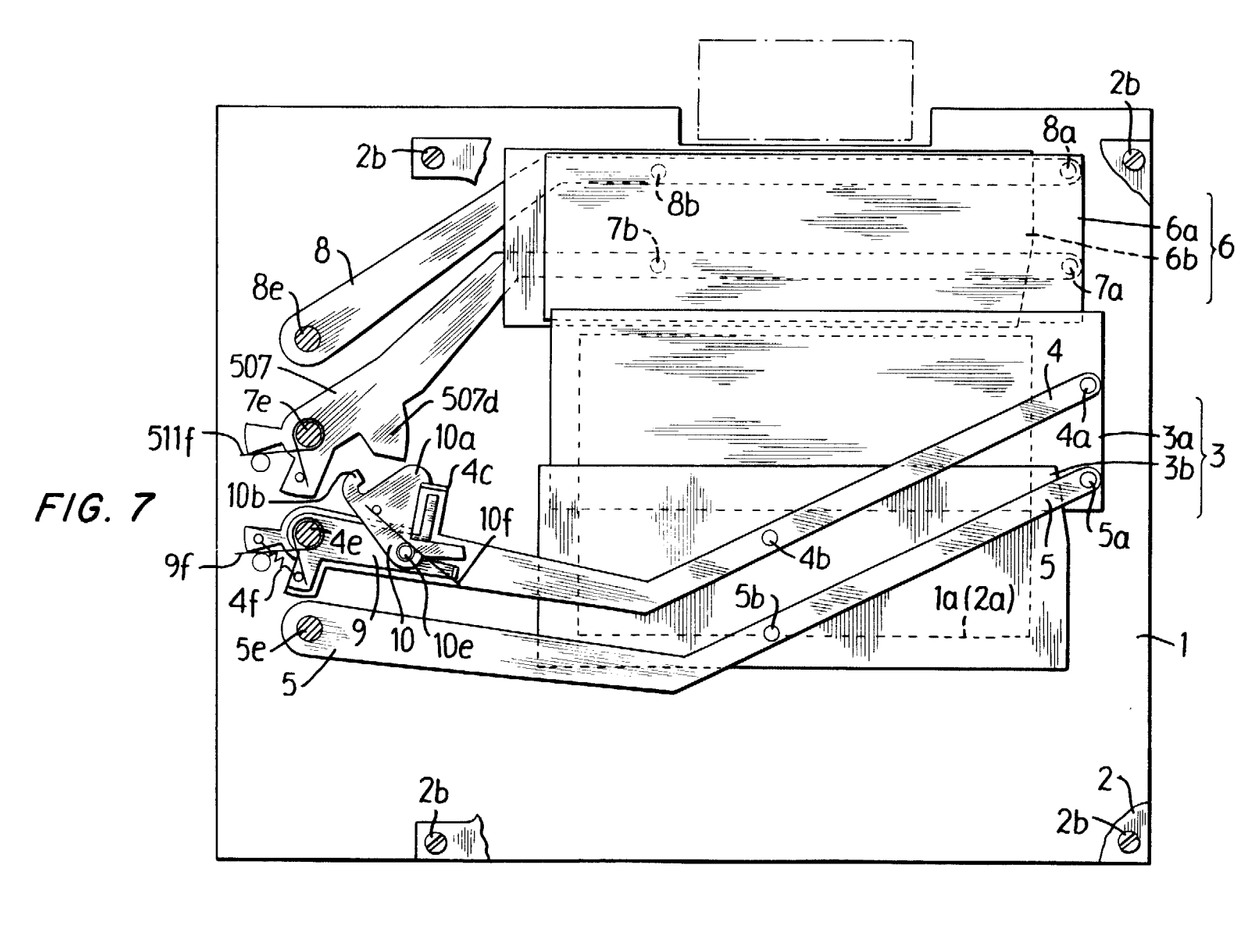
FIG. 7 is a front view showing a further modification, the shutter being shown in set condition.
Figure 8:
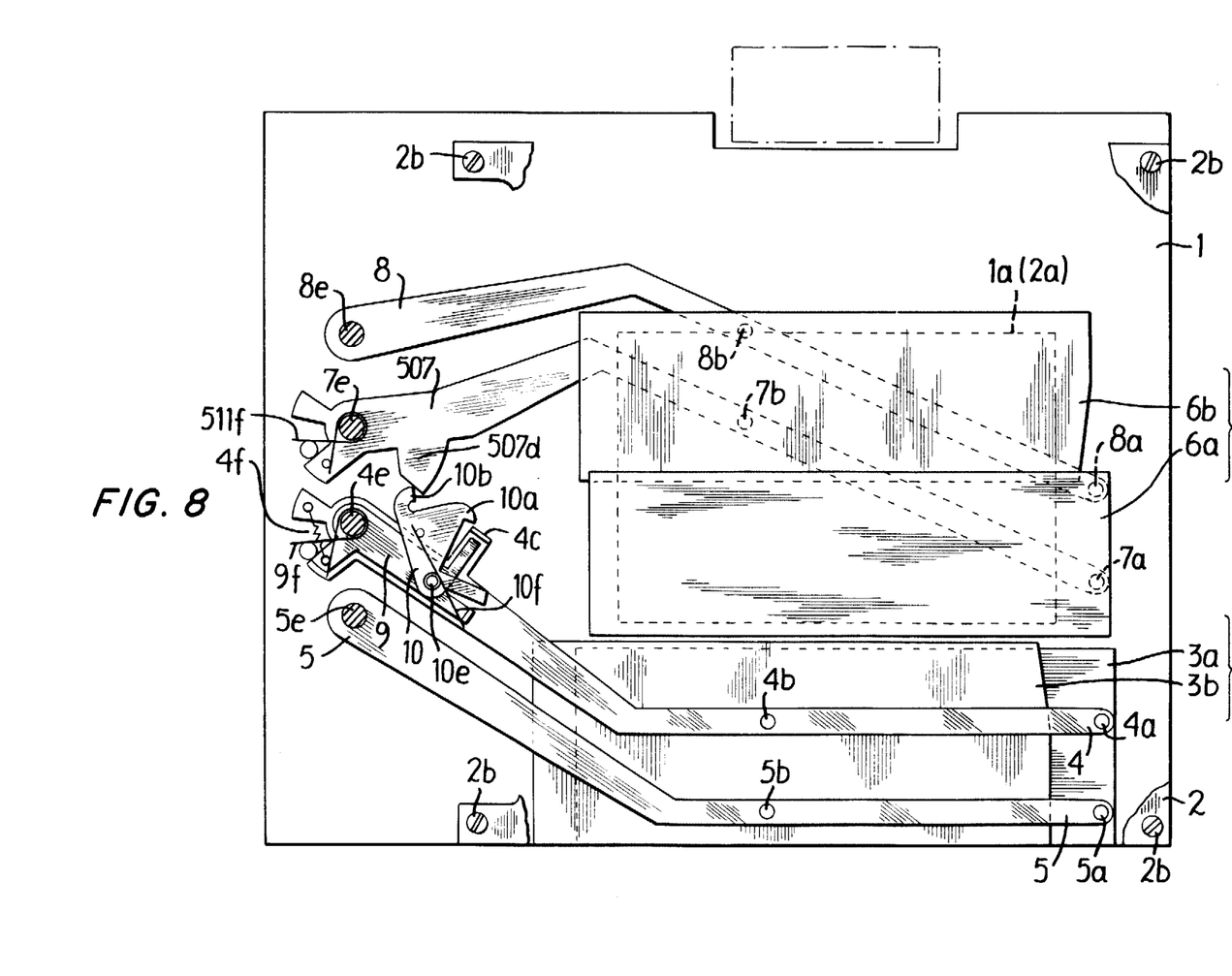
FIG. 8 shows the shutter of FIG. 7 when it has completed an exposure.
Figure 9:
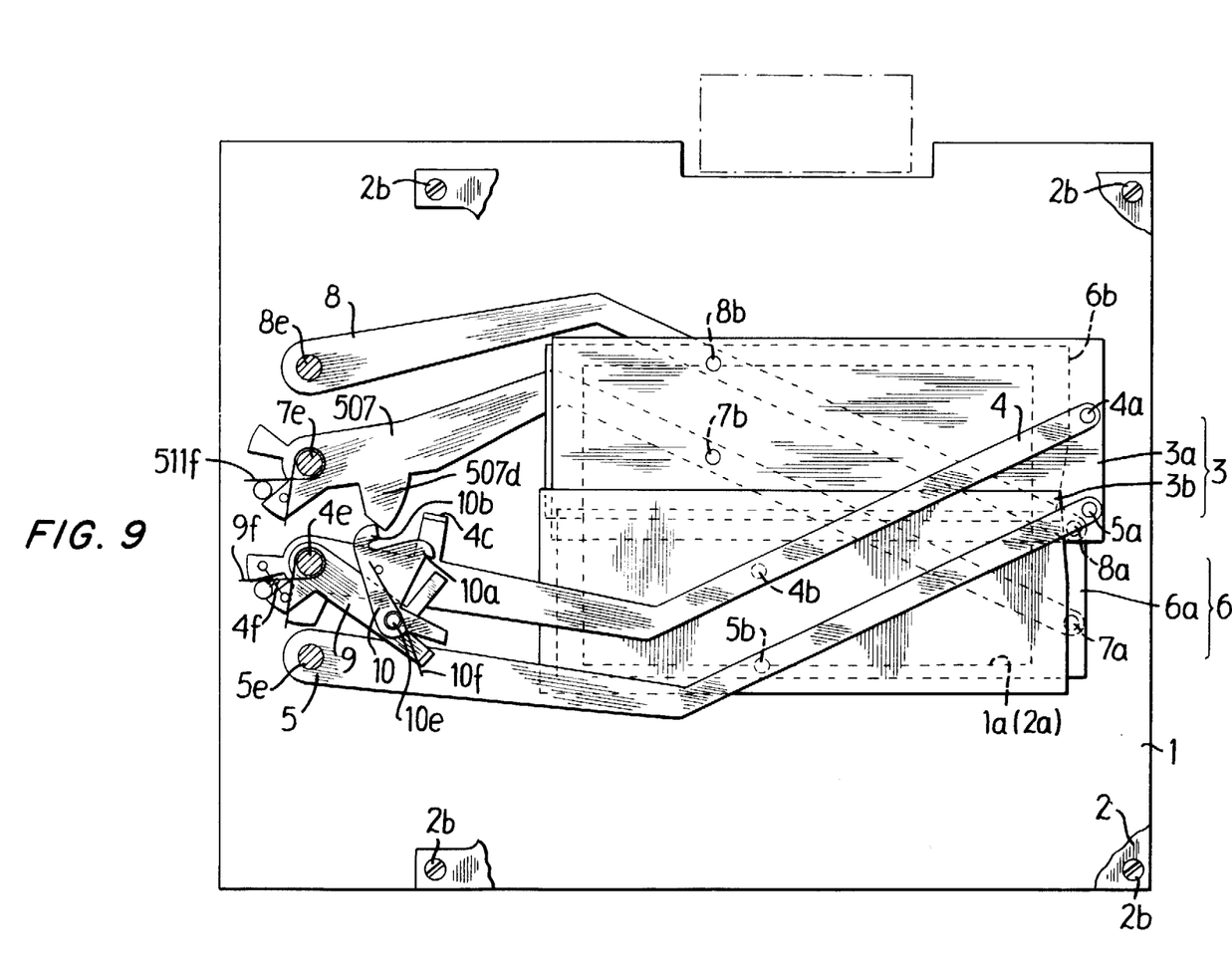
FIG. 9 shows the shutter of FIG. 7 after it has completed a sequence of actuation.

A fifth embodiment of the invention is illustrated in FIGS. 7 to 9 in which the same parts are designated by the same reference numerals as in FIGS. 1 to 3 while corresponding but modified parts are designated by the same reference numerals with the addition of 500. FIG. 7 shows the shutter in set or charged condition, FIG. 8 shows the shutter as it has just completed exposure actuation and FIG. 9 shows the shutter in the condition in which it has completed the sequence of operations initiated by release of the shutter to make an exposure. In the embodiment of FIGS. 7 to 9 the opening member 4 is provided with a bent-up tab 4c and is biased in a counterclockwise direction by a spring 4f acting between the opening member 4 and the driving member 9 of the opening shutter blades. The closing member 507 is not provided with a driving member or connecting member as in FIGS. 1 to 3 but has a laterally projecting arm 507d and is biased to turn in a clockwise direction by a driving spring 511f. The driving member 9 for the opening blades is pivotally mounted on the base plate 1 with the same axis 4e as the opening member 4 and is biased in a clockwise direction by the driving spring 9f. The connecting member 10 for connecting the opening member 4 with the driving member 9 is provided with a pawl 9a capable of locking and unlocking the bent-up tab 4c of the opening member 4 and with a bent-up tab 10b adapted to be engaged by the arm 507d of the closing member 507. The connecting member 10 is pivotally mounted on the driving member 9 by a pivot 10e and is biased in a clockwise direction by a spring 10f.

If the camera is intended to be miniaturized, the groups of opening and closing blades 3, 6 or only the group of closing blades may consist of subdivided blades (for example three or four leaves) or small blades. For the purpose of reducing the mass of inertia of a group of shutter blades, the groups of opening and closing blades 3, 6 or only the group of closing blades may be composed of small blades or may consist of light blades made for example of plastic.

When with the shutter in the charged state as shown in FIG. 7, the opening member 4 is released by well known means (not shown) the opening member 4 starts turning in a clockwise direction being driven by the driving member 9 biased by the driving spring 9f. The opening blades 3 are thereby moved downwardly to open the aperture 1a for an exposure. After an interval corresponding to the desired exposure time the closing member 507 is then released by a well known device (not shown) and the closing member 507 starts to turn in a clockwise direction by the driving force of spring 511f. The closing blades 6 are thereby moved downwardly to close the aperture 1a, thus completing the exposure operation.

The position of the parts just after the exposure actuation has been completed is shown in FIG. 8. It will be seen that the arm 507d of the closing member 507 has engaged the bent-up tab 10b of the connecting member 10 of the opening member 4 so as to force the connecting member 10 to turn in a counterclockwise direction and thereby release engagement of the pawl 10a with the bent-up tab 4c of the opening member 4. The opening member 4 is thus released from connection with the driving member 9 and starts turning clockwise under the force of spring 4f. This causes the opening blades 3 to be displaced upwardly to set position in which they close the aperture 1a. When the opening blades return to set position the sequence of operations initiated by release of the shutter is completed. FIG. 9 shows the group of opening blades 3 being displaced nearly to the set position and halted there. It will be noted that the closing blades 10 remain in closed position.

For resetting the shutter the driving member 9 of the opening blades is made to turn in a counterclockwise direction from the position shown in FIG. 9 in a well known manner against the force of the driving spring 9f and the closing member 507 is also made to turn in a counterclockwise direction in known manner against the driving spring 511f to return the closing blades to set position. The pawl 10a of the connecting member 10 thereupon reengages the bent-up tab 4c of the opening member 4 to connect the opening member 4 with the driving member 9. The opening member 4 and closing member 7 are held in set position by suitable lock or detent means in known manner until released for the next exposure.

Figure 10:
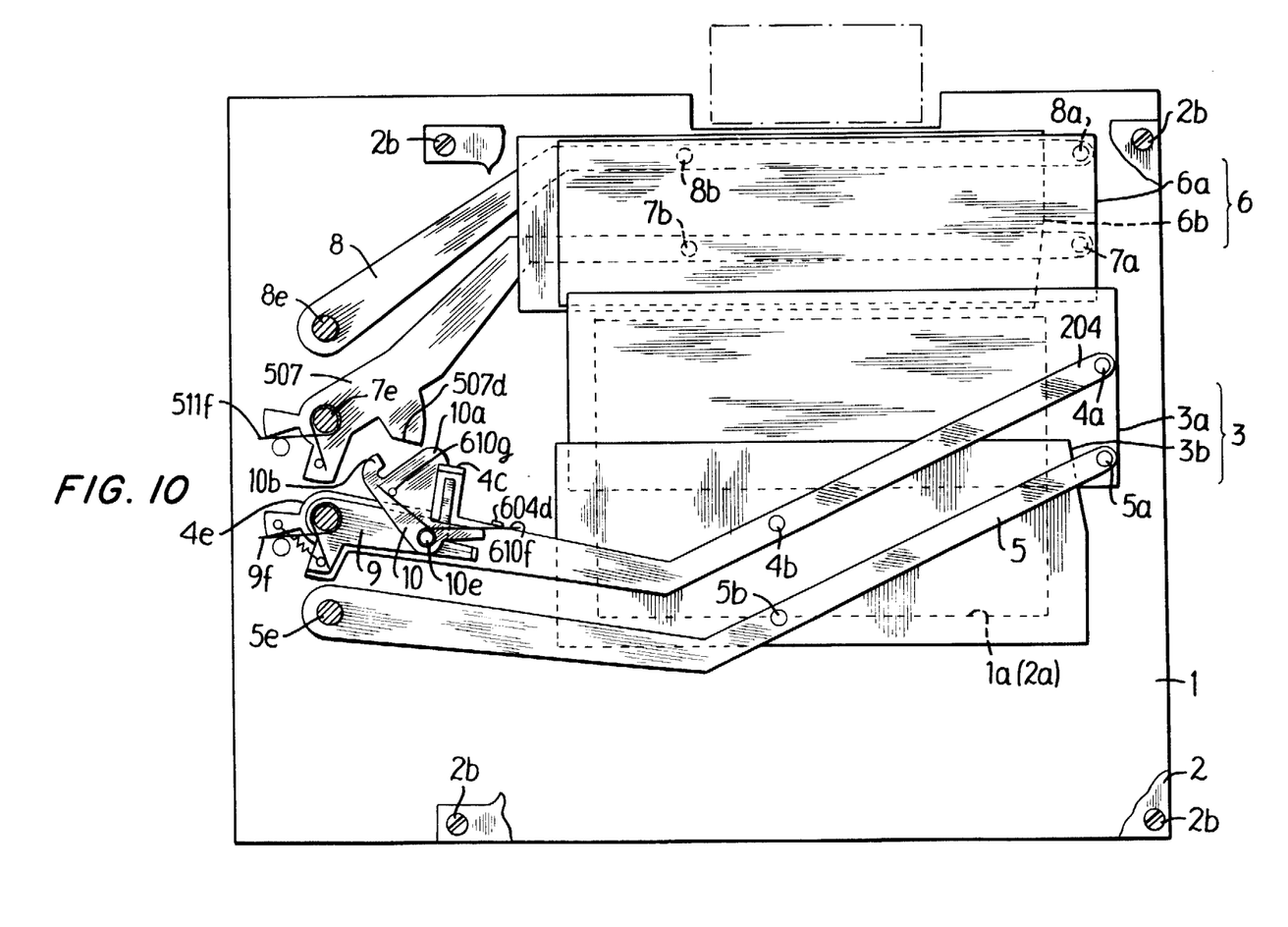
FIG. 10 is a front view of a further embodiment of the invention with the shutter shown in set condition.

A sixth embodiment of the invention is shown in FIG. 10 in which the same parts are designated by the same reference numerals as in FIGS. 7 to 9 while corresponding but modified parts are designated by the same reference numerals with the addition 600. In the embodiment of FIG. 10 a single spring 610f is used to bias the opening member 4 in a counterclockwise direction and to bias the connecting member 10 in a clockwise direction. It will be seen that the spring 610f engages a bent-up tab 604d on the opening member 4 and engages a pin 610g on the connecting member 10. Except as otherwise shown and described, the construction and operation of the embodiment of FIG. 10 are the same as those of FIGS. 7 to 9.

It will be understood that the invention is not limited to the preferred embodiments herein shown and described and that many modifications can be made. For example, the signals for releasing the respective connections between the opening member and the driving member for the opening blades or the opening and closing members and driving members of the opening and closing blades may be provided by any suitable mechanical or electric device, for example by using a magnet. The actuating mechanism can also be constructed so that the driving force for causing a group of opening blades or groups of opening and closing blades to be returned to set position may also be employed to return the reflector and lens diaphragm of a single lens reflex camera. It will further be understood that the invention is applicable to actuation of single blades instead of groups of blades as shown by way of example in the drawings. Moreover, the invention is applicable not only to focal plane shutters but to lens shutters of a type having opening and closing blades.

What we claim is:

1. In a camera having an aperture and a shutter comprising an opening blade and a closing blade for opening and closing the aperture, shutter actuating mechanism comprising:

first operating means for moving said opening blade between open and closed positions, second operating means for moving said closing blade between open and closed position, first means for biasing said first operating means in a direction to move said opening blade to set position in which it closes said aperture, driving means for driving said first operating means, second means for biasing said driving means in a direction to move said opening blade to open position, connecting means releasably connecting said driving means with said first operating means when in set position whereby said driving means when released from set position to make an exposure acts through said connecting means to drive said first operating means in a direction to open said aperture to make an exposure, means for sequentially moving said second operating means to move said closing blade to a position to close said aperture and thereby complete the exposure, and means acting on said connecting means upon completion of the exposure of release said first operating means from said driving means and thereby permit said first operating means to be moved by said first biasing means to return said opening blade to set position.

2. Shutter actuating mechanism according to claim 1, in which said first operating means comprises a pivoted operating member and said driving means comprises a pivoted driving member having the same pivot axis as said operating member.

3. Shutter actuating mechanism according to claim 2, in which said first biasing means comprises spring means acting between said operating member and said driving member.

4. Shutter actuating mechanism according to claim 2, in which said connecting means comprises a connecting member pivotally mounted on said driving member and having a pawl portion engageable with an abutment on said operating member.

5. Shutter actuating mechanism according to claim 1, in which said means acting on said connecting means to release said first operating means from said driving means comprises said second operating means.

6. Shutter actuating mechanism according to claim 1 for a single lens reflex camera having a mirror and an operating member for returning said mirror to image reflecting position, in which said means acting on said connecting means to release said first operating means from said driving means comprises said mirror operating member.

7. In a camera having an aperture and a shutter comprising an opening blade and a closing blade for opening and closing said aperture, shutter actuating mechanism comprising:

first operating means for moving said opening blade between open and closed positions, second operating means for moving said closing blade between open and closed positions, first biasing means for biasing said first operating means in a direction to move said opening blade to set position for closing said aperture, second biasing means for biasing said second operating means in a direction to move said closing blade to set position in which it uncovers said aperture, first driving means for driving said first operating means, second driving means for driving said second operating means, third biasing means for biasing said first driving means in a direction to move said opening blade to open position, fourth biasing means for biasing said second driving means in a direction to move said closing blade to closed position, first connecting means for releasably connecting said first driving means with said first operating means when in set position, whereby said first driving means when released from set position to make an exposure acts through said first connecting means to drive said first operating means in a direction to open said aperture to make an exposure, second connecting means for releasably connecting said second driving means with said second operating means when in set position whereby said second driving means when released from set position to terminate an exposure acts through said second connecting means to drive said second operating means in a direction to close said aperture to terminate said exposure, first release means acting on said first connecting means upon completion of the exposure to release said first operating means from said first driving means and thereby permit said first operating means to be moved by said first biasing means to return said opening blade to set position, and second release means acting on said second connecting means after actuation of said first release means to release said second operating means from said second driving means and thereby permit said second operating means to be moved by said second biasing means to return said closing blade to set position.

8. Shutter actuating mechanism according to claim 7, in which said first release means comprises means associated with said second operating means and operable upon said second operating means reaching a predetermined position.

9. Shutter actuating mechanism according to claim 7, in which said second release means comprises means associated with said first operating means and operable upon said first operating means reaching a predetermined position.

10. Shutter actuating mechanism according to claim 7, in which said first operating means comprises a first operating member pivotally mounted on a fixed support of said camera and said first driving means comprises a first driving member pivotally mounted on said support coaxially with said first operating member.

11. Shutter actuating mechanism according to claim 7, in which said second operating means comprises a second operating member pivotally mounted on a fixed support of said camera and said second driving means comprises a second driving member pivotally mounted on said support coaxially with said second operating member.

* * * * *